United States Patent [19]

Strop

[11] Patent Number: 5,077,071
[45] Date of Patent: * Dec. 31, 1991

[54] OIL EXTRUSION PROCESS

[75] Inventor: Hans R. Strop, Strongsville, Ohio

[73] Assignee: EPE Incorporated, Strongsville, Ohio

[*] Notice: The portion of the term of this patent subsequent to Feb. 28, 2006 has been disclaimed.

[21] Appl. No.: 403,737

[22] Filed: Sep. 6, 1989

[51] Int. Cl.$^5$ .......................... C11B 1/00; C11B 3/00
[52] U.S. Cl. ................................ 426/417; 426/429; 426/430; 426/601; 426/615; 426/655; 426/662; 260/412.2; 260/412.3
[58] Field of Search ............... 426/417, 429, 430, 601, 426/615, 655, 662; 260/412.2, 412.3

[56] References Cited

U.S. PATENT DOCUMENTS

| | | | |
|---|---|---|---|
| 2,789,120 | 4/1957 | Cavanagh | 260/426 |
| 2,997,943 | 8/1961 | Zies | 100/74 |
| 4,041,854 | 8/1977 | Cox | 100/112 |
| 4,259,252 | 3/1981 | Perry et al. | 260/412.6 |
| 4,619,789 | 10/1986 | Strop et al. | 260/412.6 |
| 4,718,337 | 1/1988 | Wiederkehr | 100/75 |
| 4,794,011 | 12/1988 | Schumacher | 426/448 |
| 4,808,426 | 2/1989 | Strop et al. | 426/417 |
| 4,874,555 | 10/1989 | Upchurch | 426/417 |

OTHER PUBLICATIONS

Farnsworth, John T. et al., "Enhancing Direct Solvent Extraction of Oilseeds by Extrusion Preparation", *Oil Mill Gazetteer*, Nov. 1986.

*Primary Examiner*—Marianne Cintins
*Assistant Examiner*—Helen Pratt
*Attorney, Agent, or Firm*—Fay, Sharpe, Beall, Fagan, Minnich & McKee

[57] ABSTRACT

A process for extracting oil from oil-bearing materials, such as vegetable oil bearing seeds and plant materials, is disclosed. The process comprises adding crude oil, water and a reagent to the oil-bearing materials to form a slurry. Subsequently, a resultant oil is extracted from the slurry. The process provides for treating the oil-bearing materials in a screw extruder. In addition, the process teaches sparging the slurry with steam to remove impurities contained therein.

A substantially toxic-free feed is obtained by maintaining the oil-bearing materials in acid reagents for about 5 minutes to hydrolyze glucosinolates to carbon dioxide and ammonia. The ammonia and carbon dioxide are subsequently stripped therefrom.

46 Claims, 6 Drawing Sheets

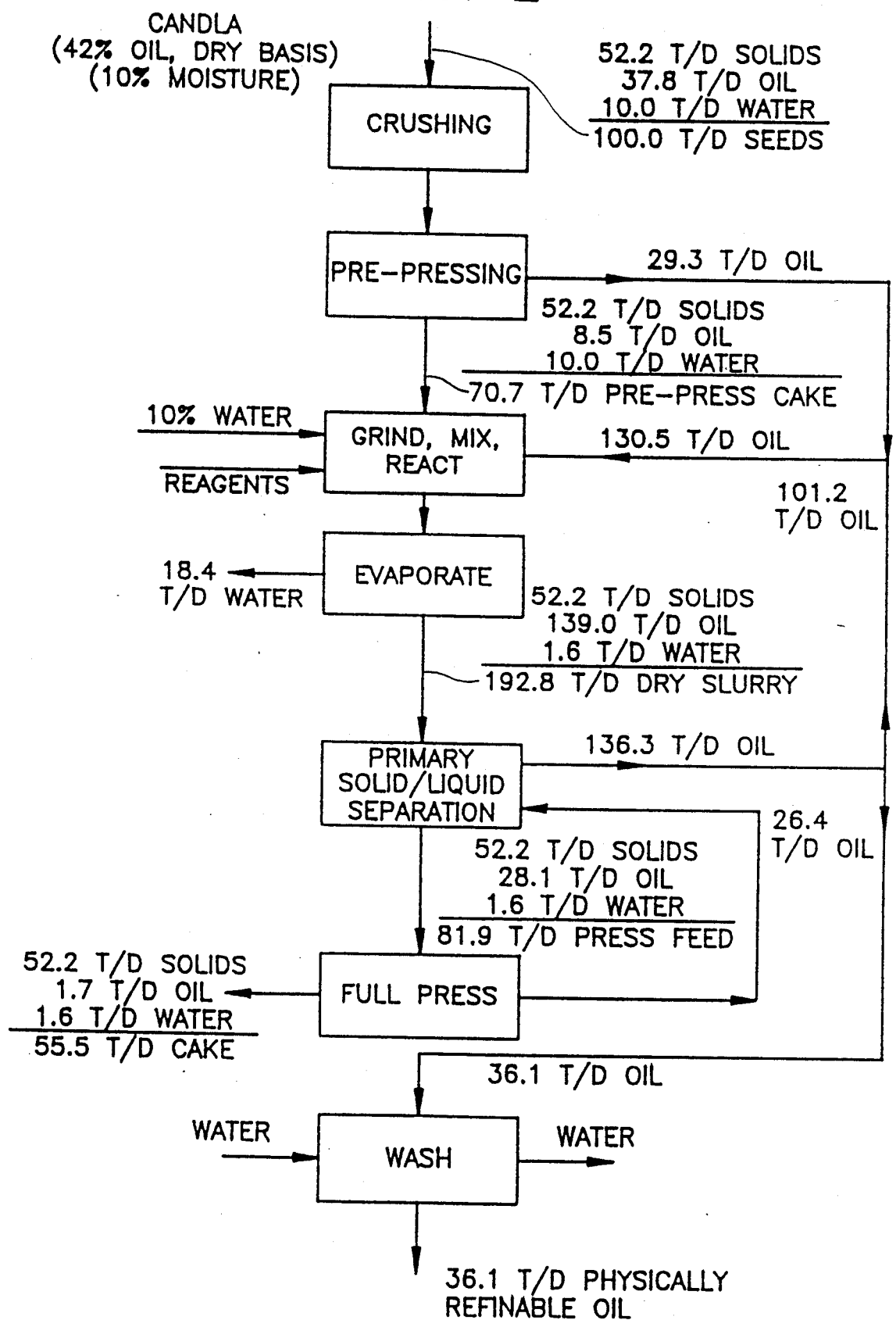

OIL EXTRUSION PROCESS

BACKGROUND OF THE INVENTION

This invention pertains to the art of oil extraction from a vegetable oil bearing material such as canola, corn germ, rapeseed, and the like, and more particularly, to a method and assembly for pre-treating oil bearing vegetable material, extracting the oil therefrom, and producing a high quality vegetable oil suitable for physical refining. This invention also pertains to the art of producing a substantially toxic-free meal from oil-bearing materials according to the process of this invention.

The invention is particularly applicable to the processing of oil from canola and corn germ, but is also applicable to many other vegetable oil bearing materials such as rapeseed, cotton seed, peanuts, sunflower seed, grape seed, fresh coconut meat, dried coconut meat, palm fruit, palm kernels and the like.

Conventional vegetable oil extraction processes produce crude oil. As the name implies the product is crude, i.e., it is laden with impurities, solid residues and sometimes water and micro-organisms. The impurities usually include free fatty acids; phospholipids; unsaponifiable matter such as plant sterols, tocopherols and hydrocarbons; trace metals; waxes; minerals and various organic complexes which may cause an undesirable "color" or "pigmentation" of the oil. Of course, some of the "impurities", such as some of the tocopherols, may be desirable. The solid residues can be cell fragments and other non-oil constituents from the oil seeds and agglomerates of phospholipids. All these impurities and solid residues cause a typical crude oil to be a foul smelling, dark appearing, sludge laden and ill tasting liquid which is indeed unfit for human consumption. It is desirable to refine these crude oils to render them fit for human consumption, and to impart the qualities of light color, bland taste and lack of odor that are often preferred.

Some of the impurities in the solid product are toxic. It is thus desirable to obtain a solid product that is non-toxic.

The Strop et al. U.S. Pat. No. 4,808,426, incorporated herein by reference, discloses a process for extracting oil from oil-bearing materials such as soybean, corn and the like, in order to produce a vegetable oil that is physically refinable without any further pretreatments. The process comprises adding at least one reagent for reducing the phospholipid content in the oil extracted, as well as an oil of preferably the same type as will be extracted, to the oil bearing material to form a slurry mixture. The oil bearing material generally comprises oil seeds or comminuted oil seeds. When the reagent and oil are added to the oil bearing material, a flowable slurry is created. In addition, a medium for a beneficent reaction which purifies the oil produced is also created. The slurry is heated at a preselected temperature for a preselected period of time, and preferably under partial vacuum. Such heating takes place in a grinding mill and slurry preparation tank.

Further processing reduces the phospholipid and trace metal content in the oil extracted from the oil bearing material. The oil product produced is light in color, shows no turbidity, and exhibits a minimal amount of phosphorous, calcium, magnesium and iron. Such product oil is ready for physical refining.

When the process set forth in U.S. Pat. No. 4,808,426 is in continued operation, a major fraction of the oil from the solid-liquid separation steps is returned to the process to be mixed with the oilseeds or comminuted oilseeds. The composition of the oil is substantially that of the oil intrinsic in the oil seeds, except, as stated above, the beneficent reactions set forth in the patent have purified the oil to a major extent.

When a vegetable oil mill using the process of U.S. Pat. No. 4,808,426 is first started up, a charge of oil from an extraneous source is needed, i.e., from a source other than the very seeds to be fed to the process at the initiation of the start up. This source must be extraneous because at the time of the start up, no oil has yet been produced from the seeds to be used. It is convenient to use an oil produced in earlier production runs for the start-up. If desired or available, a fully refined oil, i.e., an oil low in phospholipids, very low in free fatty acids, light in color and low in moisture may be used. Similarly, a partially refined oil, a chemically or physically treated oil, or an oil which has been chemically changed in composition (such as, for example, a hydrogenated oil) may also be used to initially charge the process. Each of these variations of the initial oil charge used is adaptable to the disclosure in U.S. Pat. No. 4,808,426.

During start up and operation of the process, it is foreseeable to use oils which contain additives, other than the reagents claimed in the patent, for converting the product oil into a physically refinable oil.

Once the process of the patent is in operation, a start-up oil is no longer needed because a large portion of the refined oil can be or is recycled back to the early stages of the process. The recycled oil provides a carrier medium for continued process operation.

The grinding mill or slurry preparation tank receives ingredients including seeds, reagents, water and oil. These ingredients are simultaneously stirred and reacted or cooked, and then fed to an evaporator. In large extraction mills, the tank is rather large in size. Both optimization of control of the beneficial physical and chemical processes promoting the sequestration of impurities, such as the phospholipids, and the subsequent extraction of the oil from the oil seeds, become difficult as a result of large tank size.

Large tanks are often not ideal as "reactors" for handling temperature sensitive materials at moderate temperatures. This is because it becomes prohibitively difficult to exclude oxygen, and hence expensive. In many cases, a small, highly stirred, high temperature reactor would be preferred, because the high temperatures accelerate all of the beneficial processes, while the short hold-up time in such a small reactor would prevent undesirable processes and reactions from taking place. In addition, sealing, i.e., preventing air and thus oxygen from entering such a reactor, is easier when the reactor is small.

Although the process set forth in U.S. Pat. No. 4,808,426 patent has provided substantial commercial success, it would be desirable to alter the process to provide a source of oil which could act as a start-up as well as a continuous carrier medium.

It would be further desirable to utilize a preexisting oil prepressing plant in an early step in a process directed to preparing physically refinable oil.

It would be further desirable to provide a process for extracting and refining oil from oil bearing seeds, an initial step of the process taking place in a compact, continuous reactor.

It would be further desirable to treat the oilseeds so as to provide oilseeds having increased porosity and extractability.

It would be further desirable to obtain a toxic-free meal from oil bearing materials in accordance with the process of this invention.

The present invention contemplates a new and improved process which overcomes all of the above-referenced problems and others, and provides a more efficient processing of a better quality, physically refinable oil product from a vegetable oil material as well as a substantially toxic-free meal.

BRIEF SUMMARY OF THE INVENTION

In accordance with the present invention there is provided a method and assembly for extracting oil from oil bearing seeds and plant materials such as canola, corn, rapeseed, and the like, in order to allow for the more efficient processing of a better quality oil and meal product.

More particularly, the present invention is directed to a method for producing a physically refinable oil product. Vegetable oil bearing materials are pretreated to place them in a suitable condition for oil extraction. Pretreatment can comprise cleaning, drying, cracking or dehulling. The material is then fed through a pre-pressing plant which grinds or flakes the material, partially extracts crude oil, and leaves a prepress cake which contains the balance of the crude oil. The crude oil is fed into a slurry preparation tank wherein it is mixed with water, reagents, and either the new oil bearing material, or the compressed prepress cake from the prepressing steps, or both. The purpose of adding the crude oil is to provide both a start-up medium as well as a continuous carrier medium for the process.

An advantage of the invention is that the oil produced is low in phospholipids and other impurities which interfere with the physical refining process. The oil can be physically refined without any further pretreatment.

Another advantage of the invention is that the oil produced is lower in volatile impurities. Further, during the processing steps of the invention, no physical or chemical changes have been induced which increase the complexity and/or cost of the physical refining step. Thus, crude oil from this invention may be categorized as an "easy" oil to refine by physical means.

Another advantage of the present invention is that a preexisting pre-pressing plant which forms crude oil can now be retrofit to the process set forth in U.S. Pat. No. 4,808,462 so that the crude oil produced in the preexisting plant can be further refined chemically and physically in a single process.

Another advantage of the present invention is that the resultant oil from an existing pre-pressing plant can now be directed to an extraction plant which happens to also do the refining. This avoids the conventional refining techniques which substantially add to the cost of rendering the crude oil into a refined product.

Another advantage of the present invention is that the oilseeds are placed in a condition wherein they have increased porosity and extractability.

Another advantage of the present invention is that substantially toxic-free meal can be obtained as a result of the process of the present invention.

Yet another advantage of the present invention is that the grinding and mixing steps take place in a compact continuous reactor.

Still other advantages and benefits for the subject vegetable oil extraction process will become apparent to those skilled in the art upon a reading and understanding of this specification.

BRIEF DESCRIPTION OF THE DRAWINGS

The invention may take physical form in certain parts and arrangements of parts, and in certain steps and arrangements of steps, the preferred and alternative embodiments of which will be described in detail in this specification and illustrated in the accompanying drawings which form a part hereof and wherein:

FIG. 2 is a block diagram illustrating the steps of a process in accordance with the present invention for extracting oil from an oil bearing material such as canola;

DETAILED DESCRIPTION OF THE PREFERRED EMBODIMENTS

Figure 1:
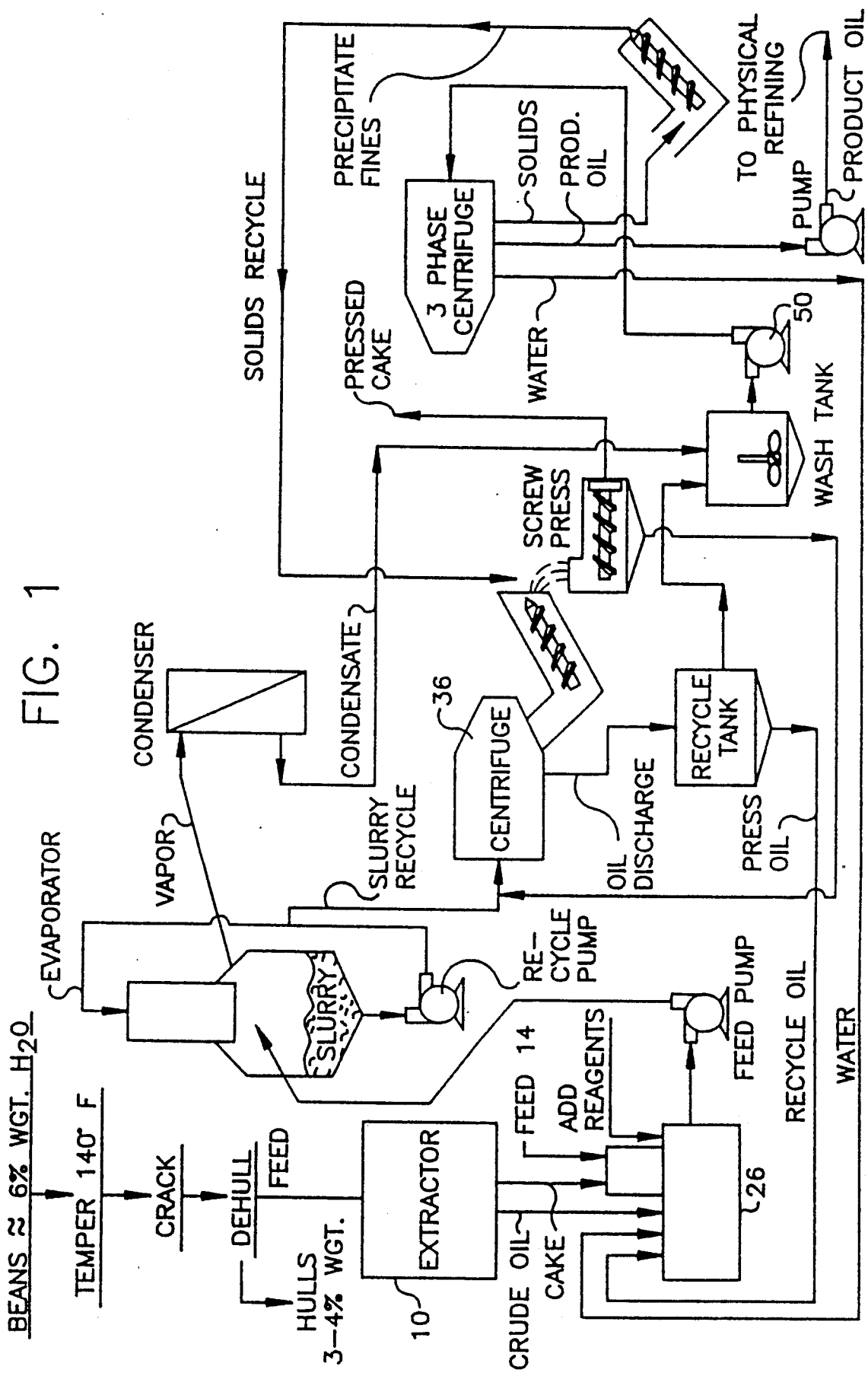
FIG. 1 is a schematic diagram of a plant formed in accordance with the present diagram for extracting oil from oil bearing material.

Referring now to the drawings wherein the showings are for purposes of illustrating the preferred and alternative embodiments of the invention only and not for purposes of limiting same, the FIGS. show a vegetable oil extraction process and assembly for the production of a good quality vegetable oil product suitable for physical refining. Although, as noted above, the invention is applicable to a wide variety of vegetable oil bearing materials, its predominant commercial concern is directed to canola and corn, and will be particularly discussed with reference to these oil bearing materials. It is to be noted that canola is a variety of rapeseed, and that the process of the present invention can be directed to other varieties of rapeseed as well. In Canada and the U.S., canola is presently the economically important seed. In Europe and elsewhere, rapeseed is the economically important seed.

With reference to FIG. 1, oil bearing seeds are subjected to a pretreatment appropriate to the oilseed type. The oilseeds may be dried, tempered, cracked and dehulled as appropriate, and then fed into a pre-press extractor 10. This extractor 10 can be a full pressing plant, a pre-press solvent extraction plant or a solvent extraction plant. As will be noted, crude oil is extracted from the feed material, and separate streams of crude oil and filter cake flow from the extractor to the remaining sections of the processing plant. The extractor may be a preexisting extraction plant to which the present assembly is retrofit as disclosed in FIG. 1. This would permit the owner of the preexisting plant to be benefitted by the fact that the crude oil initially extracted from the extractor can be further refined and processed to the final form of a product comprising physically refinable oil. On the other hand, the crude oil can be supplied from an extraneous source which is not physically joined with or adjacent to the present assembly.

The process feed may be comprised of a variety of different streams. Depending on the specific system setup, a number of situations can occur. First, the feed can comprise oilseed and crude oil from a conventional plant. Second, the feed can be comprised of oilseed, crude oil from a conventional plant, and partially de-oiled oilseed from a conventional plant. Third, the feed can simply comprise partially de-oiled oilseed. Of course, it is possible that other combinations of feed streams can occur in connection with the present invention.

In the past, crude oil which was extracted from feed was forwarded on to conventional refining techniques which include chemical refining and physical refining. These classifications are broad and exemplify many individual techniques employed in solo or in combination. Chemical refining is, in general, a total treatment or a pre-treatment using chemical washes or water washes, followed by solid-liquid separation techniques to remove large quantities of impurities and solid residues from crude oils. Physical refining, on the other hand, involves subjecting a crude oil to elevated temperatures under deep vacuum conditions.

Chemical refining is presently one of the most common total treatments or pre-treatments of oil in use. Many oils containing large quantities o non-volatile impurities or solid residue can only be chemically refined to impart the highest quality to the oil. Others require an extensive chemical refining pre-treatment before a final physical refining step is used, also to impart the highest quality to the oil. Chemical refining is, by and large, the costliest technique because of plant cost and oil losses.

Physical refining is generally a less expensive technique, but as stated earlier, if the nature of the crude is such that large quantities of impurities such as phospholipids are contained in the crude, they first must be removed. Otherwise, they would cause undesirable changes in the oil during the physical refining step. Generally, crude oil cannot be physically refined until after phospholipids have been reduced to 10 ppm or less.

The physical refining process for a crude oil is defined by the requirements for vacuum, temperature of the oil, quantity of sparge steam needed, and the need for post bleach. As compared to conventional crude oils pre-treated by chemical means for physical refining, crude oil developed from the present invention does not require as deep a vacuum, as high a temperature and as much sparge steam. Also, the step of post bleaching is often unnecessary.

Many of the standard techniques for refining conventional crude oil have proven to be expensive. That is, these techniques typically add $0.035 to $0.05 per pound to the cost of the product. To put that cost in perspective, a typical crude oil trades for $0.15 to $0.20 per pound, and, in the U.S. alone, refined oil production is about 5 million metric tons.

The cost of refining depends upon the type of oil seed crude. Major elements of cost are a) amortization of plant cost; b) cost of utilities including pollution control; and, c) loss of oil in the various refining steps because impurities and solid residues cannot be removed without the loss of good product.

Over the years, conventional refineries have exhibited many disadvantages related to the receipt of poor quality oil from conventional extraction plants. Accordingly, it is now much more economically advantageous to retrofit an existing plant to an extraction plant which also efficiently conducts further chemical and physical refining.

Figure 1A:
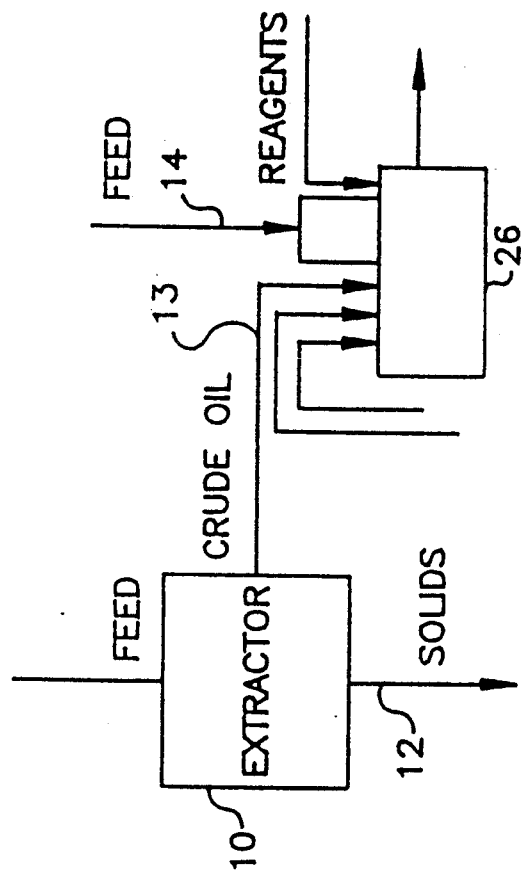
FIG. 1A is an alternative embodiment of a portion of the schematic drawing of FIG. 1.

With attention to FIGS. 1 and 1A, an extractor 10 is shown. The extractor in FIG. 1A can be representative of a solvent extraction plant or a full pressing plant. If extractor 10 is a solvent extraction plant, solids discharge 12 comprises solvent meal which contains less than 1% oil. On the other hand, if extractor 10 is a full pressing plant, solids discharge 12 comprises full press cake which is low in residual oil, i.e., approximately 5% residual oil. In view of the low amount of oil remaining in the solids discharge when the extractor is either a solvent extraction plant or a full pressing extraction plant, it serves no purpose to direct the meal or the cake to the remaining stages of the process.

If the product from extractor 10 of FIG. 1A is either full press cake or solvent meal, it is transported to cake or meal handling storage, not shown in the FIGS. It is beneficial to direct crude oil flow 13 from either the solvent extraction plant or the full pressing plant to reactor 26 to be communed with fresh feed 14.

Referring next specifically to FIG. 1, extractor 10 comprises a prepressing section of the solvent extraction plant. Prepress cake typically contains approximately 50% of the oil initially in the oil bearing seeds. This is to be contrasted with the residual oil in either full press cake or solvent meal. Accordingly, when the extractor 10 is a prepressing section, it is beneficial to direct both crude oil and prepress cake to reactor 26. FIG. 1 shows a fresh feed stream 14 flowing into reactor 26. This feed stream is optional, as the crude oil and prepress cake flowing from the prepressing section can be combined with fresh feed 14, if desired.

Figure 4:
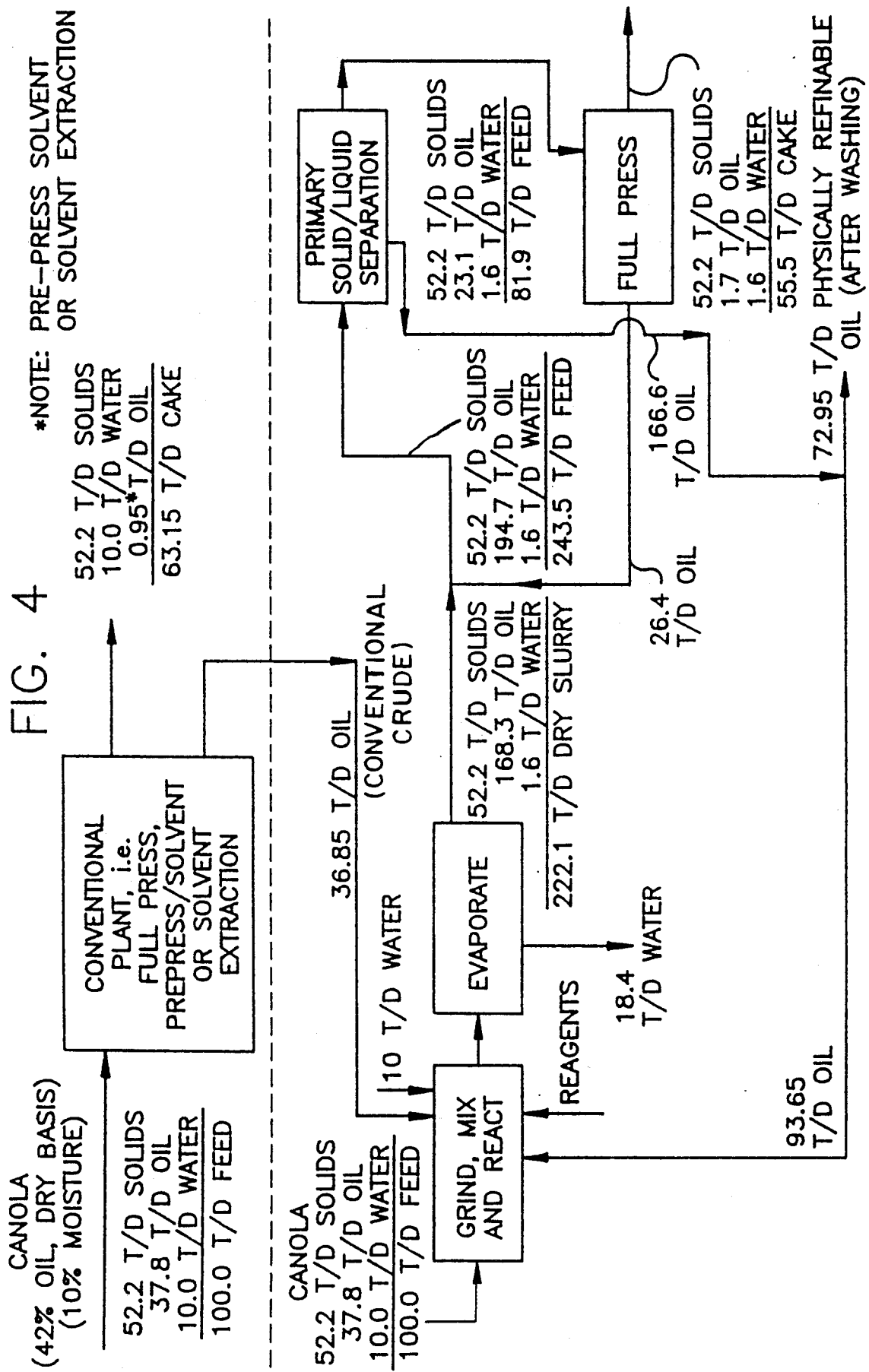
FIG. 4 is a block diagram illustrating the steps of a process in accordance with the present invention wherein the steps of extracting oil from an oil bearing material such as canola are integrated with a conventional pre-pressing plant; and, FIG. 5 is a block diagram illustrating an alternate embodiment of the process wherein a screw extruder acts as a reaction vessel.

FIG. 4 shows a situation which corresponds to FIG. 1A where the extractor is either a solvent extractor or a full press extractor, and the meal or cake contains a negligible quantity of oil. The balance of the process thus uses crude oil from a conventional plant. The crude oil is fed to the "grind, mix and react" step. Fresh canola feed is also added to this step.

As noted in FIG. 1, the crude oil and filter cake are shown flowing from the extractor and into a reactor 26. The reactor 26 can be selected from a number of different types of equipment. For example, it can be a grinding mill and slurry preparation tank, a stirred reactor, or a mixing tank. As will be more fully discussed below, reactor 26 can also be a screw extruder which offers many advantages to the oil extraction process. Not only does the screw extruder increase the porosity and extractability of the oil bearing seeds, but it is compact and provides continuous operation as well.

It is not necessary that the crude oil used as a start-up or carrier medium be of the same nature as the product oil. In fact, the crude oil can be provided from an extraneous source, and it can be quite dissimilar from the product physically refinable oil. FIG. 1A shows the crude oil entering reactor 26 while additional feed from an extraneous feed source (not shown) is also added.

Figure 3:
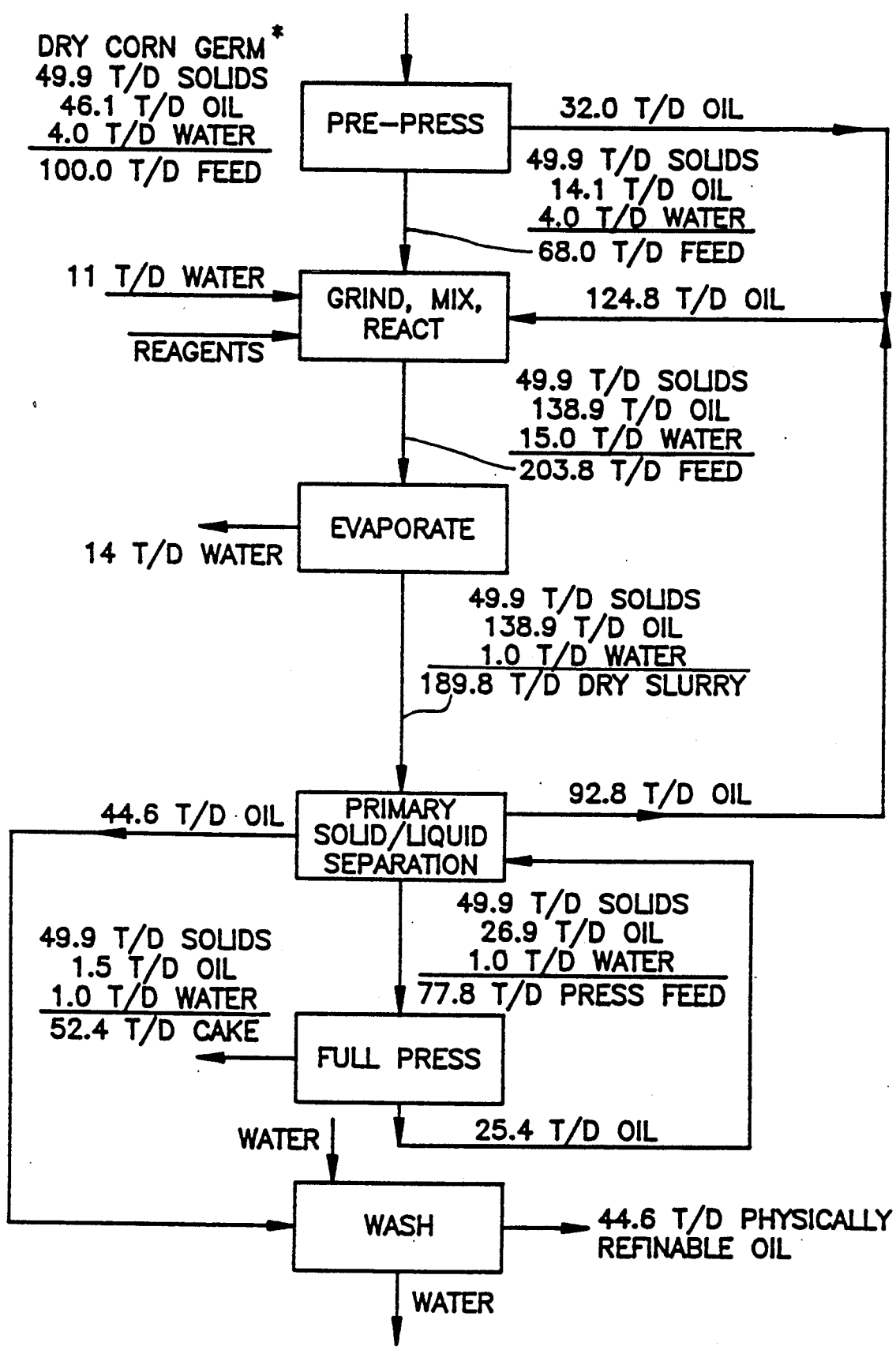
FIG. 3 is a block diagram illustrating the steps of a process in accordance with the present invention for extracting vegetable oil from an oil-bearing material such as dry corn germ.

The fact that any crude oil might be used to operate the process of the invention has substantial commercial value as primarily illustrated in FIGS. 2–4 for canola (FIGS. 2 and 4) and dry corn germ (FIG. 3). It should be noted that other oilseeds o oil bearing materials such as cottonseed, wet corn germ, peanuts, copra, fresh coconuts, palm kernels, palm fruit and the like may be similarly processed to advantage. As stated above, a corollary advantage of this finding is that the process of the invention may be retrofit to a conventional plant and, consequently, existing facilities may be used or shared.

The crude oil which is added to reactor 26, whether or not the prepress cake is added, provides a start-up medium, as well as a continuous carrier medium for the entire process. The oil combines with the solids to form a slurry.

Water is added as a carrier for the reagents. It aids in a uniform dispersion of the reagents through the oilseed matrix and the slurry, and improves the subsequent extraction of the oilseed from the treated oilseed particles. The water further provides moisture and assists the crude oil in forming a slurry. Water is immiscible in oil, and the slurry is one of wet solids and water particles in oil.

It is also possible to form a water slurry or an aqueous slurry. In such an instance, it is desirable to limit the amount of water added. In addition, a portion of the water should be removed prior to extraction. Typically, the step of removing water occurs as a result of heating or evaporation.

Reagents can be added to the slurry to reduce the phospholipid content in the oil extracted from the oil bearing material. Such reagents can be selected from the following group "A": phosphoric acid ($H_3PO_4$), citric acid ($HOOCCH_2C(OH)(COOH)CH_2COOH$-$H_2O$), hydrochloric acid (HCl), potassium chloride (KCl), sodium chloride (NaCl), sodium hydroxide (NaOH), disodium hydrogen phosphate ($Na_2HPO_4$), potassium dihydrogen phosphate ($KH_2PO_4$), acetic anhydride ($(CH_3CO)_2O$), sulfuric acid ($H_2SO_4$), sodium borate ($Na_2B_4O_7$) glycine ($NH_2CH_2COOH$), maleic anhydride ($C_4H_2O_3$) and formic acid (HCOOH).

As taught in U.S. Patent No. 4,808,426, subsequent agents can be added, such as citric acid ($HOOCCH_2C(OH)(COOH)CH_2COOH$-$H_2O$), sodium citrate ($C_6H_5O_7Na_3$-$2H_2O$); sodium chloride (NaCl); sodium acetate ($NaC_2H_3O_2$); sodium sulfate ($Na_2SO_4$); sodium hydrogen sulfate ($NaHSO_4$); trisodium phosphate ($Na_3PO_4$); EDTA (ethylenediaminetetraacetic acid ($(HOOCCH_2)_2NCH_2CH_2N(CH_2COOH)_2$)); sodium fluoride (NaF), sodium-oxalate ($Na_2C_2O_4$); sodium-tartrate ($Na_2C_4H_4O_6$-$2H_2O$); sodium carbonate ($Na_2CO_3$); sodium pyrophosphate ($Na_4P_2O_7$); and surfactants and proteins from the group that includes ethoxylated fatty alcohol, oleylamine, casein, pancreatin, soy protein and Na-soap. For ease of reference, the above reagents and reagent groups may be designated to be part of reagent group "B".

In the preferred practice of the invention, one or more reagents from group "A" and from group "B" may be added. It is, however, within the scope of the invention to add one or more reagents from one group only, or one or more from both groups, and still produce an improved product oil.

With continued reference to FIG. 1, it is noted that the oil and water added to the reactor 26 are obtained through continuous system recycle operations.

In one commercial embodiment of the invention, the canola preparation tank level is controlled so that under steady state conditions the ratio of about two to three parts of recycled oil to one part of canola solids is maintained (dry basis). Approximately 10 weight percent of water is added to the canola based upon the weight of the dry canola solids introduced. The water may be condensate from other plant processing steps, with or without demineralizing water make up. The various liquid or solid reagents comprising acids, bases, salts and others which are added to the slurry preparation tank 26 are added to enhance the quality of the end product oil. Emphasis is placed on removal of phospholipids, trace metals and other impurities such as, in the case of canola oil, the glucosidic materials (glucosinolates) and their hydrolysis products. These sulfur containing organic impurities in conventional crude canola oil interfere with the proper functioning of the catalysts used in hydrogenation of the oil. Their removal from canola oil by the process is highly beneficial.

FIG. 2 shows the process of the invention as it is retrofit to an existing pre-press, solvent extraction plant. A solvent extractor is deactivated and pre-press oil and pre-press cake flows from the pre-pressing section of the plant may be conducted to the process of the invention for the purpose of extracting the canola oil and rendering this oil in a physically refinable state. FIG. 2 further shows a process flow sheet with mass balance data for a capacity of 100 tons per day (T/d). However, canola extraction mills are typically large enough to produce 500 tons per day or more. For such plants, the crushing and pre-pressing sections may represent several millions of dollars worth of capital equipment. Retaining this process of the invention has considerable economic merit.

The process of FIG. 2 shows 100 T/d of canola seeds being fed to the process. After crushing and prepressing, prepress cake and crude oil, together with oil recycled from further portions of the process, are added to the reactor 26 wherein the respective ingredients are ground and mixed to form a slurry. In the particular process shown in FIG. 2, a total of 139 T/d of oil are fed to the reactor. The oil is a combination of recycled oil, oil that has been retrieved in the prepress section, and oil that is still in the prepress cake. Water and reagents are also added to form a slurry. The slurry is then fed to an evaporator wherein it is subjected to heat. The water evaporates, and a resulting 192.8 tons per day of dry slurry is fed to a solid/liquid separator. Much of the resulting separated oil, about 101.2 T/d, is recycled back to the reactor. The remaining separated oil is washed with water, and 36.1 T/d of physically refinable oil product is produced.

The solids remaining after the separation step are passed on to a full pressing step from which additional oil is extracted and recycled back to the separator.

FIG. 3 teaches retrofitting the present invention to a corn germ extraction line with a prepress solvent extraction plant. The solvent extraction section is deactivated, and oil and solid product from the pre-pressing section is conducted to the equipment in which the new process is practiced. The balance of the oil is extracted, and all the oil, that is, the crude oil from the pre-press section which is high in phospholipids, as well as the oil extracted in the process, are together rendered physically refinable.

The process shown in FIG. 3 for corn germ is very similar to that shown in FIG. 2 for canola. Dry, tempered corn germ is fed to a pre-press section at the rate of 100 tons per day (T/d). A crude oil flow of around 32 T/d exits from the pre-press section and is mixed with the filter press cake, recycled vegetable oil, water, and reagents. The slurry that forms in the reactor is fed to an evaporator to evaporate approximately 14 T/d of water. The dry slurry is then subjected to a solid/liquid separation process which separates oil at the rate of 44.6 tons per day. The oil is washed, and the physically refinable oil product is attained. The solids from the separator are pressed under full pressing conditions, and oil is cycled back to the separator at the rate of about 25.4 tons per day.

FIG. 4 shows the integration of a conventional plant with a plant of the new invention. It shows how a conventional plant of any type, such as for example, a full press plant, pre-press solvent extraction plant or a direct solvent plant may be integrated with a plant of this invention. The example shown here is for canola. The conventional section, as well as the process of the present invention, are shown as equal in capacity. It must be noted, however, that any combination of plant capacities may be used, provided the reagent flow rates are adjusted and enough oil is recycled from the primary solid/liquid separation step to the "grind, mix and react" step to insure flowability of the slurry feeding the evaporation step. In this particular example, the canola solvent meal is discarded, and the crude oil extracted from the prepressing section acts as a start-up and carrier medium for the process. Crude oil is fed to the reactor at the rate of approximately 36.85 T/d. Like the flow diagrams of FIGS. 2 and 3, 100 T/d of seeds are also supplied to the reactor. The remainder of the process is essentially similar to that of FIGS. 2 and 3; however, after washing, a product flow is obtained at the rate of 72.95 tons per day. The product comprises physically refinable oil. This exit flow rate, is substantially greater than that which was obtained in the processes of FIGS. 2 and 3. The primary reasons for this increased productivity include that crude oil from an extraneous source is being rendered into a physically refinable state as well.

In FIGS. 2-4, it must be noted that the "grind, mix and react" step is depicted as 26 in FIG. 1. This reactor can be a conventional mixing tank or it can be a screw extruder. The screw extruder is more specifically identified in FIG. 5.

It is well known that extrusion preparation of many oilseeds has increased the capacity of existing solvent extraction plants. Further, if an existing solvent extraction plant is retrofitted with extruders for pretreating the oilseeds prior to solvent extraction under carefully controlled and defined operating conditions, the throughput of said direct solvent extraction plant can be doubled.

Conventionally, oilseeds and oil bearing materials are fed whole or in comminuted form to a barrel of an extruder. The seeds or seed particles may be preheated or moistened by the addition of steam or water, or a combination of both. The oilseeds, oil seed particles, or oil bearing materials are pulverized or masticated by a screw in the extruder. This causes the temperature of the mass of material progressing through the extruder to rise. The degree of mastication, and thereby the heating, may be controlled by certain operating parameters of the extruder such as screw speed, screw configuration and flow resistance of the discharge of the extruder. Also, the heating of the mass of materials may be further enhanced or controlled by injection of water or steam or both into the barrel. Also, the barrel may be heated or cooled by means of a heating or cooling medium being circulated through the jacket or jackets of the barrel or barrel sections.

The extruder is often referred to as an extruder-cooker because it "cooks", i.e., heats in the presence of moisture, the mass of material passing through it.

Figure 5:
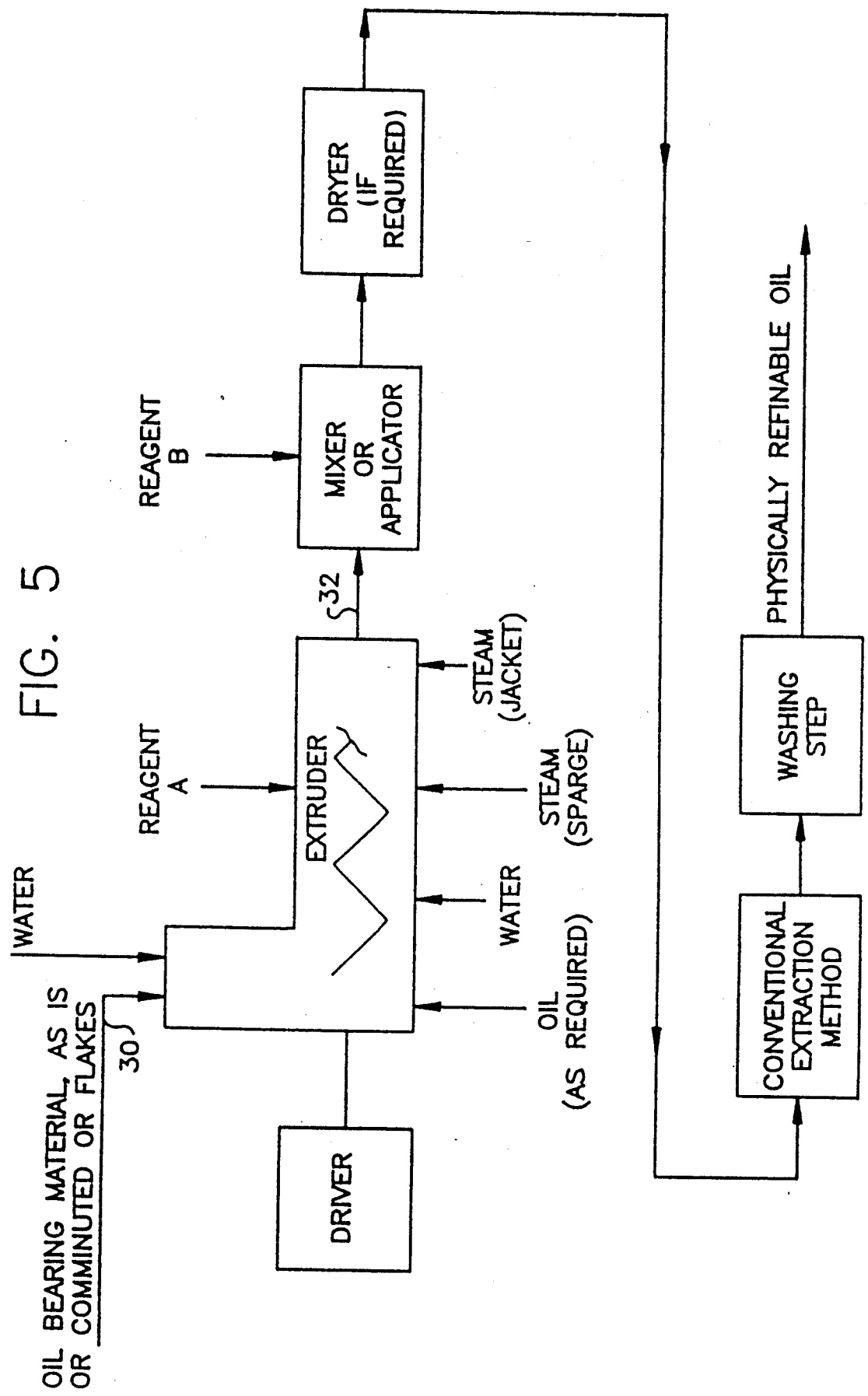

FIG. 5 is a block diagram illustrating a screw extruder that is used as a reactor for the step of grinding, mixing and slurry preparation. The screw extruder is more compact and continuous than many of the conventional stirred reactors or mixing tanks. In addition, the oilseeds which are subjected to the extruder have increased porosity and extractability as compared to the oilseeds treated conventionally. Overall, the screw extruder is notably more efficient than the conventional reactor vessels used in the past.

Although the screw extruder can be a preferred embodiment of the "grind, mix and react" step of the present invention or of the process disclosed in U.S. Pat. No. 4,808,426, it can also be used in conjunction with a conventional extraction method such as a solvent extraction method. That is, while the screw extruder can be used to advantage as a reactor to partially accommodate the "grinding, mixing and reacting" step of U.S. Pat. No. 4,808,426 and the present process, it can also be used as a "grinding, mixing and reacting" step preceding a "conventional extraction" process. In such an instance, some or no water can be added to the extruder. Furthermore, it is possible that no oil is added. It is to be noted, however, that with some oilseeds, some oil may be liberated in the mastication process. The discharging product may have the consistency of a paste, but it is not a slurry. By adding reagents from groups A or B, a pretreated oil bearing material is produced which, by using conventional extraction techniques, will yield a physically refinable oil.

A screw extruder will provide some grinding, but not much. It acts as a good mixer, and depending upon the viscous properties of the material through it, an excellent reactor. That is, the mastication of the material causes the material to heat up. The temperature of the material increases from the inlet or feed hopper 30 to the discharge 32 of the extruder. However, if too much water is added to the feed or to the material in the barrel, the viscosity will drop and heating will drop accordingly. With the presence of moisture from the moisture in the feed, as well as from the water, added to the barrel already foreseen, this viscosity drop will not propose a problem and the extruder treatment will be beneficial. Accordingly, some or no water may be added to the extruder, depending on the particular circumstances.

Furthermore, if oil is added in the barrel, there will be a drop in viscosity. Likewise, if too much oil is added, viscosity will drop to such an extent that heating through mastication will substantially cease and the extruder will not be able to act as a high temperature reactor. With high oil content materials such as canola and corn germ, it is unlikely that significant quantities of additional oil can be added in the extruder. In such an instance, the slurry preparation step is extraneous and subsequent to the extrusion step.

As stated earlier, an extruder is not a fully effective grinder or pulverizer but can, of course, partially grind feed materials. The screw extruder is, however, an effective mixer and reactor to promote the beneficial chemical reactions which cause the crude oil, upon extraction, to be physically refinable. It also enhances the physical changes which promote porosity in the oilseed particles and, therefore improves extractability of the oil in the subsequent oil removal from the solids.

In practical terms, it is likely that the seeds would be ground before being introduced to the extruder. The seeds may not have to be ground as fine as they are for introduction into other reaction vessels, because the high temperatures reached in the extruder would allow for proper heat and mass diffusion in larger particles.

Oil bearing materials are introduced into the extruder, and steam or water, or both, can be added in order to reach the desirable moisture and temperature conditions at the discharge of the extruder. One or more reagents from group a and group B, both listed above, can be added. For example, A reagent "A", can be added into the barrel position of the extruder. A slurry is formed. The slurry is then discharged to a mixing vessel, and oil and a reagent "B" can be mixed with the slurry.

It is also possible to introduce only some of the oil into the extruder. The remaining amount can be introduced elsewhere down the process such as in the mixer. FIG. 5 shows reagent "B" being introduced into the reactor. It would also be possible to introduce the reagent "B" in the barrel of the extruder downstream of the point where the reagent "A" is introduced. In doing so, it would again be feasible to introduce only a part of the oil in the extruder.

It was also found that an extruder can be fed oilseeds, oil seed particulates or oil bearing materials. These can be heated in the extruder under cooking and pelletizing conditions as, for example, with reagent "A" added prior to the mass of materials discharging. The discharged mass of materials could then be mixed with reagent "B". The mass of materials, after partial drying as required or as desired, may be extracted by means of full-pressing, pre-press solvent extraction or direct solvent extraction to yield a crude oil which, after a washing step, will be physically refinable, i.e., which will contain no more than 20 ppm of phospholipids measured as phosphorous.

It is further within the scope of the invention to add reagent "B" in the barrel of the extruder either simultaneous with reagent "A" or downstream of the injection point for reagent "A".

As discussed above, Strop et al. U.S. Pat. No. 4,808,426 disclosed a process for extracting oil from oil bearing materials such as soybean, corn and the like, in order to produce a vegetable oil that is physically refinable without any further pretreatments.

A physically refinable oil is characterized by a low content of phospholipids, impurities and solid residues. A physically refinable oil including a physically refinable oil from the process disclosed in U.S. Pat. No. 4,808,426 still contains free fatty acids and other volatile and bleachable impurities which need be removed from the oil to render it fit for the requirements of the U.S. retail marketplace. This market requires a very low residual free fatty acid concentration, typically 0.05% or less (measured as oleic); a low concentration of moisture and other volatiles, typically 0.05% or less; low (lovibond) red and yellow and passing scores of odor and flavor tests.

Typically, the oil intrinsic in the oil seed may contain 0.5 to several percent of free fatty acids, and varying percentages (usually small fractions of one percent) of volatiles considered undesirable in the end product which is commonly referred to in the trade as an RBD (Refined, Bleached and Deodorized) oil. One group of volatiles of considerable concern with certain oil seeds is the phytosterols. These are thought to cause diseases of the human cardiovascular system. Cholesterol is an example of a phytosterol. Some plant seed oils may contain as much as 0.006% of phytosterols.

The actual percentage content of free fatty acids and other volatiles depends upon the type of oil seed and its agronomic, harvest and storage history.

In any case, fairly large quantities of volatiles must be removed in the physical, refining step which is, in essence, a high temperature, deep vacuum, steam distillation process. It is evident that lesser concentrations of volatiles are desirable because, depending upon the type of oil being processed, less sparge steam may be required, and temperature and vacuum requirements may be relaxed. The capital cost of the physical refining equipment may also be reduced.

The process of U.S. Pat. No. 4,808,426 requires an evaporation step to remove excess water added to the slurry of comminuted oil seeds and oil, and to remove excess water resident in the oil seeds fed to the process. Such water may be removed by single stage or multiple stage evaporator bodies. These typically include a heat exchanger for adding the necessary heat for the evaporation of a fraction of the moisture. If necessary, a vapor separator can be added for the sensible heat of the stage feed in order to increase the temperature of the product in the stage to the operating temperature of the stage. The slurry heated in the heat exchanger discharges to the vapor separator where all or a substantial part of the vapor is separated from the slurry. A pumping means can also be added for introducing the feed to the stage, recycling (if necessary) the slurry from the vapor separator to the heat exchanger, and discharging the totally or partially dried slurry to the next stage or to the next step in the process. A vacuum means for establishing pressure and temperature conditions in the stage can be added as well.

It was found that the content of impurities or volatiles such as free fatty acids are reduced by virtue of the water vapor being released in the evaporator stage because of the heat added in that stage.

It was found that the content of volatiles such as free fatty acids are further reduced if steam or water vapor is sparged in the slurry circulating in the stage while being heated.

Various types of steam sparge means for distributing steam in a liquid may be used. One preferred embodiment consists of perforated piping which is fed with steam under pressure, and submerged in the slurry in the vapor separator. Other means of steam distribution known from steam distillation practice may also be used.

The latent heat in the stripping steam, combined with the latent heat of the water evaporated in the stage, may be recycled to provide a heating means to heat a subsequent stage of the evaporator. As this latent heat is transferred to the slurry, the water vapor condenses and with it the volatiles contained in it. These volatiles such as the free fatty acids may be separated by various means known to the art, as they are products with significant commercial value.

It was also found that in the extraction of canola oil, by using acid reagents from reagent group A, such as phosphoric acid and citric acid, a canola crude oil was produced. The canola crude oil was not only low in phospholipids, and therefore physically refinable, but further evidenced considerable reduction of organic sulfur compounds as measured by the reduction in sulfur. This reduction in sulfur in turn reduces the quantity of nickel catalyst required in any subsequent hydrogenation step, and is thus of substantial economic benefit.

A major problem with the economics of conventional extraction of canola and rapeseed is that the extracted solid by-product from oil extraction (in the trade referred to as canola or rapeseed meal) will contain larger or smaller quantities of the above mentioned organic sulfur compounds, generally classified as glucosinolates, and their hydrolytic products such as isothiocyanates, and the like. As with all oilseed meals, the economic value of the meal is its value as an animal food. These organic sulfur compounds and their hydrolytic products at best have antinutritive properties, i.e., they cause the animal to consume less of a feed containing it or, if the animal consumes it, a feed containing it is much less efficiently converted into animal products of economic interest such as, for example, meat or milk, In the worst case a feed mixture containing excess canola or rapeseed meal may be toxic in animal feeding.

It is well known that the presence of moisture and the exposure to high temperatures during the extraction process increases the hydrolysis of the glucosinolates into their toxic hydrolytic products, rendering the meal produced even more toxic. For example, it is well known in full pressing of canola and rapeseed that pressing for the lowest residual oil content in the meal causes high temperatures which in turn renders the meal more toxic or anti-nutritive. Also, for example, in solvent extraction of canola or rapeseed high temperatures must be avoided in the desolventizing-toasting step to prevent undesirable changes in the meal.

In the treatment of cyanate waste products from various industrial processes, it is well known that such cyanates can be oxidized to carbon dioxide and ammonia by hydrolysis under acidic conditions of a pH of 2 to 3. (Industrial Wastewater Treatment Technology, James W. Patterson, p. 116-117, Butterworth Publishers.)

In the process of U.S. Pat. No. 4,808,426, the quantities of acid compounds from reagent group A may be maintained such that acidic conditions at pH of 2 to 3 exist for a minimum period of about five minutes to completely hydrolyze the glucosinolates and their cyanate breakdown products to carbon dioxide and ammonia. While carbon dioxide is innocuous, ammonia is not in an animal feed product. In the subsequent evaporation step both ammonia and carbon dioxide are stripped from the slurry by the escaping water vapor. Upon separation of the treated solids from the dry slurry discharging from the evaporator, a canola or rapeseed mean is obtained that is substantially free of any toxic compounds.

The invention has been described with reference to the preferred embodiments. Obviously, modifications and alterations will occur to others upon the reading and understanding of the specification. It is our intention to include all such modifications and alternations insofar as they come within the scope of the appended claims or the equivalents thereof.

Having thus described the preferred embodiments of the invention, the invention is now claimed to be:

1. A process for extracting oil from oil-bearing material selected from the group consisting of vegetable oil-bearing seeds and plant materials, the process comprising the steps of:
   extracting crude oil from a first oil bearing material;
   mixing the crude oil with a second oil bearing material to form a slurry;
   adding water to the slurry;
   adding a reagent to the slurry, the reagent added to reduce the phospholipid content in the oil extracted from the oil-bearing material; and,
   subsequently extracting a resultant physically refinable oil from the slurry, the product oil corresponding to the oil in the second oil bearing-material.

2. The process according to claim 1 further comprising the step of grinding the slurry.

3. The process according to claim 2 wherein the step of grinding occurs in a grinding mill.

4. The process according to claim 2 wherein the step of grinding occurs in a screw extruder.

5. The process according to claim 1 further comprising the steps of mixing and reacting the slurry.

6. The process according to claim 5 wherein the steps of mixing and reacting occur in a reactor.

7. The process according to claim 6 wherein the reactor is a crew extruder.

8. The process according to claim 6 wherein the reactor is a mixing tank.

9. The process according to claim 1 further comprising the step of heating the slurry.

10. The process according to claim 1 further comprising the step of partially removing the water by evaporation prior to the step of extracting the resultant oil from the slurry.

11. The process according to claim 1 wherein the crude oil is extracted from the first oil-bearing material according to a pressing extraction method.

12. The process according to claim 1 wherein the crude oil is extracted from the first oil-bearing material according to a solvent extraction method.

13. The process according to claim 1 wherein the second oil bearing material is a partially de-oiled oil bearing material.

14. The process according to claim 1 wherein the second oil bearing material is a partially de-oiled oil bearing material, and a portion of the crude oil is crude oil from a conventional process.

15. The process according to claim 1 wherein a portion of the crude oil is crude oil from a conventional process.

16. The process according to claim 1 wherein a portion of the oil bearing material is a partially de-oiled oil bearing material and a portion of the crude oil is crude oil from a conventional process.

17. A process for extracting oil from oil bearing materials selected from the group consisting of oil bearing seeds and plant materials, the process comprising the steps of:
   extracting crude oil from first oil bearing materials;
   introducing the crude oil into a screw extruder;
   introducing second oil bearing materials into the screw extruder;
   masticating the second oil bearing materials in the screw extruder;
   adding water to the oil bearing materials to form a slurry;
   introducing a reagent A to the slurry; and
   subsequently extracting resultant physically refinable product oil.

18. The process according to claim 17 further comprising the step of heating the slurry.

19. The process according to claim 17 further comprising the step of partially removing the water from the slurry prior to the step of extracting resultant oil, subsequent to the step of introducing a reagent A, and subsequent to the step of masticating the oil bearing materials.

20. The process according to claim 17 further comprising the step of mixing oil with the slurry.

21. The process according to claim 17 wherein reagent A is a member of the group consisting of $(CH_3CO)_2O$, $HOOCCH_2C(OH)(COOH)\text{-}CH_2COOH\text{-}H_2O$, $HCl$, $KCl$, $NaCl$, $NaOH$, $Na_2HPO_4$, $KH_2PO_4$, $H_3PO_4$, $H_2SO_4$, $Na_2B_4O_7$, $NH_2CH_2COOH$, $C_4H_2O_3$ and $HCOOH$.

22. The process according to claim 17 further comprising the step of adding a second reagent to the mixture.

23. The process according to claim 22 wherein said second reagent includes at least one material selected from the group consisting of ethoxylated fatty alcohol, oleylamine, casein, pancreatin, soy protein, Na-soap, citric acid, sodium citrate, sodium chloride, sodium acetate, sodium sulfate, sodium hydrogen sulfate, trisodium phosphate, EDTA, sodium fluoride, sodium-oxalate, sodium-tartrate, sodium carbonate and sodium pyrophosphate.

24. A process for extracting oil from oil-bearing materials, the process comprising:
   extracting crude oil from first oil bearing materials;
   providing second oil bearing materials;
   adding water and the crude oil to the second oil bearing materials to form a slurry;
   adding a first reagent to the slurry to form a resultant mixture;
   grinding the resultant mixture;
   heating the resultant mixture;
   subjecting the mixture to solid-liquid separation;
   subsequently extracting a physically refinable resultant oil.

25. The process according to claim 24 wherein the first reagent is selected from the group consisting of $(CH_3CO)_2O$, $HOOCCH_2C(OH)(COOH)\text{-}CH_2COOH\text{-}H_2O$, $HCl$, $KCl$, $NaCl$, $NaOH$, $Na_2HPO_4$, $KH_2PO_4$, $H_3PO_4$, $H_2SO_4$, $Na_2B_4O_7$, $NH_2CH_2COOH$, $C_4H_2O_3$ and $HCOOH$.

26. The process according to claim 24 wherein the step of grinding occurs in a grinding mill.

27. A process for extracting oil from vegetable oil bearing seeds, the process comprising the steps of:
   adding feed comprising vegetable oil bearing seeds to a screw extruder at an inlet of the screw extruder;
   adding a carrier crude vegetable oil from an extraneous source to the inlet of the screw extruder;
   moving the feed and carrier crude vegetable oil from the inlet of the screw extruder to a discharge of the screw extruder;
   masticating the feed as it moves through the screw extruder;
   increasing the temperature of the feed as it moves from the inlet to the discharge of the extruder;
   discharging the feed from the extruder; and
   subsequently preparing a slurry.

28. The process of claim 27 further comprising the step of adding a reagent to promote beneficial chemical reactions which cause the crude oil to be physically refinable.

29. The process of claim 28 wherein the reagent is selected from the group A consisting of $(CH_3CO)_2O$, $HOOCCH_2C(OH)(COOH)\text{-}CH_2COOH\text{-}H_2O$, $HCl$, $KCl$, $NaCl$, $NaOH$, $Na_2HPO_4$, $KH_2PO_4$, $H_3PO_4$, $H_2SO_4$, $Na_2B_4O_7$, $NH_2CH_2COOH$, $C_4H_2O_3$ and $HCOOH$.

30. The process of claim 28 wherein the reagent is selected from the group B consisting of ethoxylated fatty alcohol, oleylamine, casein, pancreatin, soy protein, Na-soap, citric acid sodium citrate, sodium chloride, sodium acetate, sodium sulfate, sodium hydrogen sulfate, trisodium phosphate, EDTA, sodium fluoride, sodium-oxalate, sodium-tartrate, sodium carbonate and sodium pyrophosphate.

31. The process of claim 27 wherein the step of preparing a slurry comprises the step of adding oil to the discharged feed.

32. The process of claim 27 further comprising the step of adding water to the feed.

33. A process for extracting oil from oil bearing materials selected from the group consisting of oil-bearing seeds and plant materials, comprising the steps of:
   introducing oil-bearing materials into a screw extruder;
   adding a carrier oil from an extraneous source to the oil bearing materials;
   adjusting the moisture content in the oil bearing materials;
   introducing reagent A into the barrel of the screw extruder;
   mixing reagent A with the oil bearing materials in the screw extruder;
   masticating the oil bearing materials in the barrel of the screw extruder;
   chemically reacting the oil bearing materials in the extruder to reduce a phospholipid content thereof; and,
   subsequently subjecting the oil bearing materials to a conventional extraction process to extract a resultant oil from the oil bearing materials.

34. The process of claim 33 wherein the conventional extraction process comprises direct solvent extraction.

35. The process of claim 33 wherein the conventional extraction process comprises mechanical removal of the oil by means of a screw press.

36. The process of claim 33 wherein reagent A is a member of the group consisting of $(CH_3CO)_2O$, $HOOCCH_2C(OH)(COOH)\text{-}CH_2COOH\text{-}H_2O$, $HCl$, $KCl$, $NaCl$, $NaOH$, $Na_2HPO_4$, $KH_2PO_4$, $H_3PO_4$, $H_2SO_4$, $Na_2B_4O_7$, $NH_2CH_2COOH$, $C_4H_2O_3$ and $HCOOH$.

37. The process according to claim 33 further comprising the step of adding a second reagent to the mixture.

38. The process according to claim 37 wherein said second reagent includes at least one material selected from the group consisting of ethoxylated fatty alcohol, oleylamine, casein, pancreatin, soy protein, Na-soap, citric acid, sodium citrate, sodium chloride, sodium acetate, sodium sulfate, sodium hydrogen sulfate, trisodium phosphate, EDTA, sodium fluoride, sodium-oxalate, sodium-tartrate, sodium carbonate and sodium pyrophosphate.

39. A process for producing physically refinable oil low in impurities other than phospholipids from vegetable oil bearing material, comprising the steps of:
   adding at least one reagent to reduce the phospholipid content in the vegetable oil extracted from the oil bearing material to form a mixture;
   adding oil different than the oil to be produced to the oil bearing material to form a slurry;
   heating the slurry;
   sparging the slurry with steam or water vapor to remove volatile impurities from the slurry; and subsequently, producing a physically refinable oil that is low in volatile impurities.

40. The process of claim 39 wherein the step of heating the slurry takes place in an evaporator wherein water vapor is released and the content of volatile impurities in the slurry is reduced as a result of releasing the water vapor.

41. The process of claim 39 wherein the step of sparging comprises distributing steam through the slurry.

42. The process of claim 39 wherein the volatile impurities in the slurry comprise free fatty acids.

43. The process of claim 39 further comprising the step of adding water to the slurry before the step of heating.

44. The process of claim 43 wherein the step of heating the slurry takes place in an evaporator wherein water vapor is released and the content of volatile impurities in the slurry is reduced as a result of releasing the water vapor.

45. The process of claim 43 wherein the step of sparging comprises distributing steam through the slurry.

46. The process of claim 43 wherein the volatile impurities in the slurry comprises free fatty acids.

* * * * *